United States Patent
Iranyi et al.

(10) Patent No.: US 12,392,430 B2
(45) Date of Patent: Aug. 19, 2025

(54) CONNECTION DEVICE FOR A PERIPHERALLY RIBBED PIPE

(71) Applicant: VIESSMANN CLIMATE SOLUTIONS SE, Allendorf (DE)

(72) Inventors: Daniel Iranyi, Steinhausen (CH); Reto Schneller, Barcelona (ES); Uwe Werner, Hütten (CH)

(73) Assignee: VIESSMANN CLIMATE SOLUTIONS SE, Allendorf (DE)

( * ) Notice: Subject to any disclaimer, the term of this patent is extended or adjusted under 35 U.S.C. 154(b) by 8 days.

(21) Appl. No.: 18/036,057

(22) PCT Filed: Oct. 27, 2021

(86) PCT No.: PCT/EP2021/079832
§ 371 (c)(1),
(2) Date: May 9, 2023

(87) PCT Pub. No.: WO2022/101016
PCT Pub. Date: May 19, 2022

(65) Prior Publication Data
US 2023/0392726 A1    Dec. 7, 2023

(30) Foreign Application Priority Data
Nov. 10, 2020 (EP) .................................. 20206703

(51) Int. Cl.
F16L 25/00    (2006.01)
(52) U.S. Cl.
CPC ....... *F16L 25/0045* (2013.01); *F16L 25/0054* (2013.01); *F16L 2201/10* (2013.01)

(58) Field of Classification Search
CPC ............... F16L 25/0045; F16L 25/0054; F16L 2201/10; F16L 37/088; F16L 37/096; F16L 37/098; F16L 37/0985; F16L 37/0987
(Continued)

(56) References Cited

U.S. PATENT DOCUMENTS

| | | | | |
|---|---|---|---|---|
| 3,403,930 A | * | 10/1968 | Bernier | ................... H01R 13/62 285/317 |
| 3,753,582 A | * | 8/1973 | Graham | .............. F16L 37/0885 37/459 |

(Continued)

FOREIGN PATENT DOCUMENTS

| | | |
|---|---|---|
| CN | 1894530 A | 1/2007 |
| DE | 39 03 353 A1 | 8/1990 |

(Continued)

OTHER PUBLICATIONS

International Search Report for PCT/EP2021/079832 dated Jan. 17, 2022.

(Continued)

*Primary Examiner* — David Bochna
(74) *Attorney, Agent, or Firm* — Sughrue Mion, PLLC

(57) ABSTRACT

A connection device for a peripherally ribbed pipe (4), including: a pipe receptacle (1) having a receiving opening for receiving an end of the pipe (4); and a catch element (3) for fastening the pipe (4) in the pipe receptacle (1). The pipe receptacle (1) has a longitudinal center plane (M), which extends through the receiving opening. The catch element (3) has a first point (SI), which allows movement of at least part of the catch element relative to the pipe receptacle (1), and a second point (S2), which is designed to engage in a corrugation trough (41) of the peripherally ribbed pipe (4). At least when the pipe (4) is inserted and fastened, the first point (SI) lies closer to the longitudinal center plane (M)

(Continued)

than the second point (S2) does. The connection device allows easy, leaktight, and secure fastening of a pipe.

16 Claims, 5 Drawing Sheets

(58) Field of Classification Search
USPC .................................... 285/321, 305, 322
See application file for complete search history.

(56) References Cited

U.S. PATENT DOCUMENTS

| | | | | |
|---|---|---|---|---|
| 4,035,005 | A | * | 7/1977 | DeVincent .......... F16L 37/0985 |
| | | | | 285/924 |
| 4,423,891 | A | | 1/1984 | Menges |
| 5,628,531 | A | * | 5/1997 | Rosenberg .......... F16L 37/0985 |
| | | | | 285/87 |
| 5,711,553 | A | * | 1/1998 | Bonser ................ F16L 37/0985 |
| | | | | 285/921 |
| 5,725,258 | A | | 3/1998 | Kujawski |
| 5,797,634 | A | * | 8/1998 | Bonser ................ F16L 37/0985 |
| | | | | 285/921 |
| 5,857,716 | A | | 1/1999 | Thomas |
| 6,155,610 | A | | 12/2000 | Godeau et al. |
| 2006/0113792 | A1 | * | 6/2006 | Weithorn ............. F16L 37/098 |
| | | | | 285/305 |
| 2007/0126230 | A1 | | 6/2007 | Feger et al. |
| 2018/0216769 | A1 | * | 8/2018 | Rodriguez ........... F16L 37/098 |

FOREIGN PATENT DOCUMENTS

| | | |
|---|---|---|
| DE | 94 00 905.8 U1 | 3/1994 |
| DE | 202 10 654 U1 | 11/2002 |
| DE | 10214682 C1 | 8/2003 |
| DE | 10 2012 222 623 A1 | 6/2014 |
| EP | 0 086 900 A1 | 8/1983 |
| EP | 0 915 282 A2 | 5/1999 |
| EP | 0 939 265 A2 | 9/1999 |
| WO | 02/02983 A1 | 1/2002 |

OTHER PUBLICATIONS

Written Opinion for PCT/EP2021/079832 dated Jan. 17, 2022.
Communication dated Mar. 21, 2025 issued by the State Intellectual Property Office of the P.R.China in application No. 2021800753803.

* cited by examiner

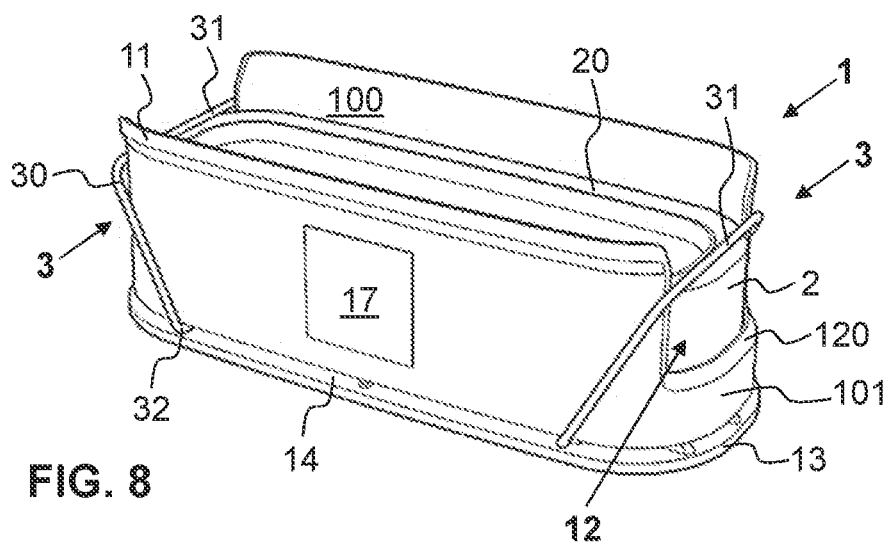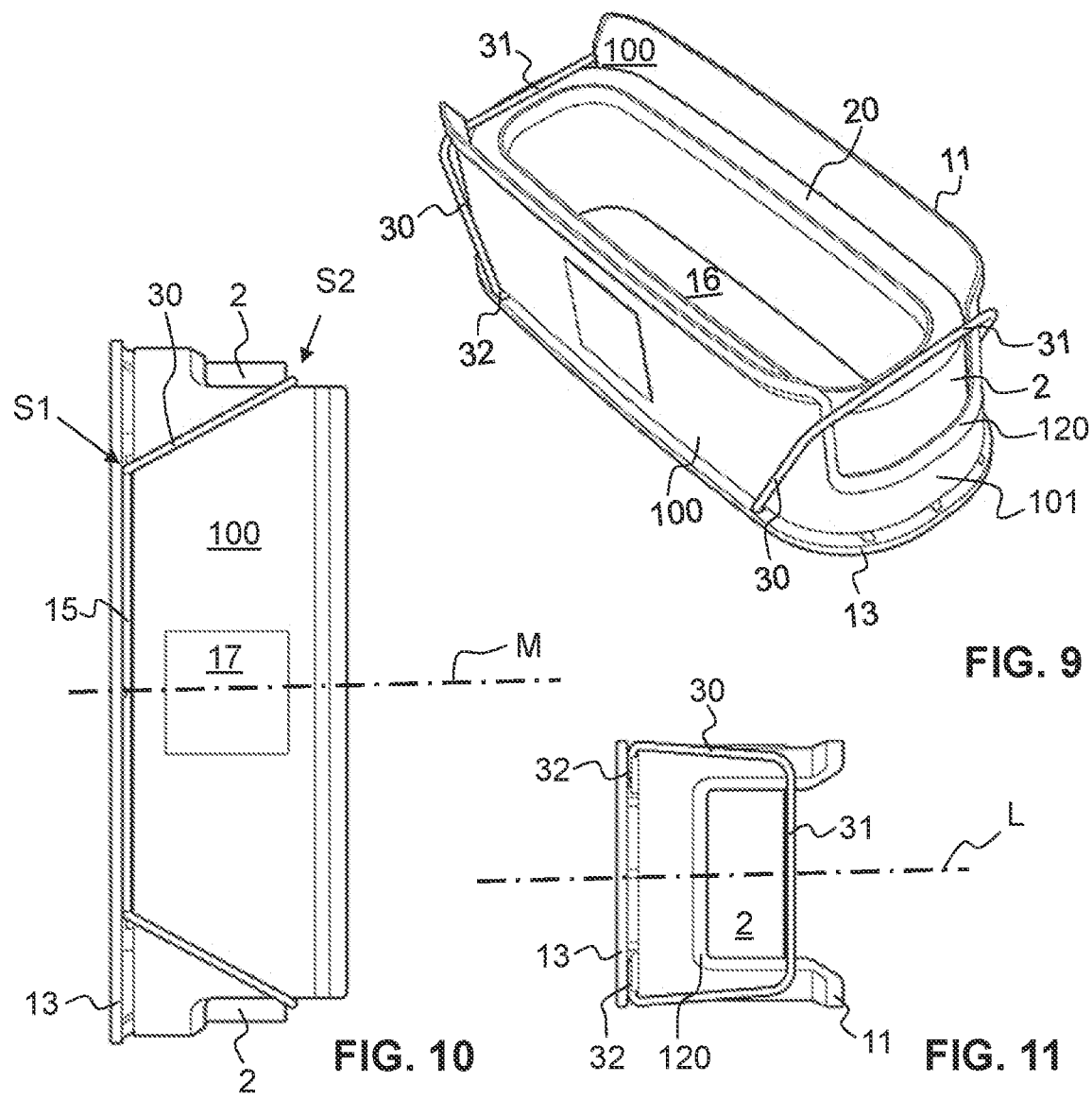

CONNECTION DEVICE FOR A PERIPHERALLY RIBBED PIPE

CROSS REFERENCE TO RELATED APPLICATIONS

This application is a National Stage of International Application No. PCT/EP2021/079832 filed Oct. 27, 2021, claiming priority based on European Patent Application No. 20206703.9 filed Nov. 10, 2020.

TECHNICAL FIELD

The present invention relates to a connection device for a peripherally ribbed pipe, in particular for connecting or for joining ventilation pipes.

PRIOR ART

Peripherally ribbed pipes, in particular corrugated pipes, are used, for example, a protective pipes for cables or pipes having small diameters or they serve as carriers for liquids and gases. The pipes are used, in particular, in ventilation technology, such as for example in ventilation systems of buildings.

In particular in ventilation technology, it is relevant that the pipe connections are sufficiently leak-tight that the energy requirement of the ventilation appliance is not increased by leakages and that whistling noises are avoided. Moreover, concrete water should not pass into these ventilation pipes when concrete is cast on the construction site. This is more likely to be ensured on the construction site if the pipe connections can withstand forces, in particular tensile forces, so that connections which have been already joined together in the construction phase cannot be released such they become untight again.

In this text, the term "corrugated pipe" comprises, in particular, metal hoses and plastic hoses. Such plastic hoses are also sometimes denoted amongst professionals as "corrugated hoses". The peripheral ribs are shaped differently according to the embodiment.

Preferably, the ribs are configured as individual ribs which are preferably uniformly spaced apart, or they form a cylindrical spiral. The term "peripherally ribbed pipe" used in this text relates to such a corrugated pipe and also to pipes which have on their outer face other types of ribs with corrugation troughs between the individual ribs.

Connection devices which preferably permit a simple, rapid and secure connection are required for connecting two pipes or for connecting a pipe to a connecting piece.

DE 39 03 353 A1 discloses a connection fitting for corrugated pipes with a sleeve for receiving an end of the corrugated pipe and with a tongue which can be deflected and which extends in the axial direction of the fitting and which engages in a corrugation trough of the corrugated pipe.

DE 94 00 905.8 U1 discloses a quick-connect coupling device for corrugated hoses which serve as protective hoses for electrical cables. The device has an elastically deformable latching unit which is arranged in an inclined manner in the direction of the longitudinal axis. This connection can be released again by means of an opening unit which can be inserted between the corrugated pipe and the latching unit.

WO 02/02983 discloses a connection fitting for corrugated pipes with a retaining sleeve into which the pipe can be inserted, and with a retaining ring which is initially elastically widened in the radial direction when the pipe is inserted and which is subsequently latched into a corrugation trough of the pipe.

DE 202 10 654 U1 discloses a sleeve between a pipe and a connecting piece, wherein the sleeve engages in a corrugation trough of the pipe and is connected to the connecting piece or also engages in a groove therein. In the region of the sleeve at least one sealing ring is arranged in a further corrugation trough of the pipe.

EP 0 086 900 A1 discloses a connecting nipple for peripherally ribbed insulating pipes, the connecting nipple having a sealing ring, a wall recess and a locking tongue with inwardly protruding transverse ribs. When the insulating pipe is inserted into the connecting nipple, the sealing ring is compressed in the axial direction until the transverse ribs are radially aligned with two corrugation troughs of the insulating pipe. The locking tongue can then be engaged in the wall recess by finger pressure, whereby the insulating pipe is retained such that it is fastened in the nipple.

In some cases, these connection devices have no seal so they cannot be used for ventilation pipes. In some cases, the connection devices are of relatively complex construction or are not easy to handle, whereby they are unsuitable for use on a construction site. Moreover, in some cases the connection devices barely provide sufficient protection against being pulled out.

SUMMARY OF THE INVENTION

It is thus an object of the invention to provide a connection device which remedies the aforementioned drawbacks.

The connection device according to the invention for a peripherally ribbed pipe comprises a pipe receptacle having a receiving opening for receiving an end of the pipe and at least one latching element for fastening the pipe in the pipe receptacle. The pipe receptacle has a longitudinal center plane which passes through the receiving opening. The latching element has a first point which allows movement of at least part of the latching element relative to the pipe receptacle, and a second point which is designed to engage in a corrugation trough of the peripherally ribbed pipe. At least when the pipe is inserted and fastened, the first point lies closer to the longitudinal center plane than the second point.

The latching element is preferably connected at its first point to the pipe receptacle, or is retained or mounted at this point in or on the pipe receptacle. In other embodiments, however, this first point is separate from the point at which the latching element is connected to the pipe receptacle or is retained or mounted therein or thereon.

The movement is preferably a pivoting movement. Other types of movements, for example a displacement or a combination of a displacement with a pivoting movement, are also possible.

The first point preferably defines a pivot point or a pivot axis of the latching element. Depending on the embodiment, the pivotability preferably comprises a few angular degrees or it corresponds simply to a small resilient movement of the pivotable part of the latching element. The longitudinal center axis of the device preferably runs in the longitudinal center plane.

In preferred embodiments, the latching element engages in exactly one corrugation trough. In other embodiments, the latching element is configured such that it engages in two or more corrugation troughs. Depending on the embodiment, the engagement takes place simultaneously or sequentially.

This arrangement of the first and second point according to the invention increases the retaining forces when a tensile force is applied to the corrugated pipe. The protection against pulling out is increased. Moreover, due to the automatic increase in the retaining forces no further securing of the latching element is required. This also simplifies the device and facilitates the assembly thereof.

Moreover, this arrangement permits a simple, robust and cost-effective design of the connection device. No complex recesses or integrally formed locking tongues are required.

The arrangement also permits a simple assembly of the pipe and thus facilitates the handling thereof. Embodiments can also be configured in which the pipe only has to be inserted and is automatically gripped and fastened by the latching element, without locking tongues or other fastening means having to be pushed down by hand. The quality assurance at the construction site is thus increased.

The quality assurance can also be increased during assembly when a visual display is present, the visual display making it possible to monitor whether the pipe is correctly inserted and fastened in the pipe receptacle and/or whether a seal has been correctly created between the pipe and the pipe receptacle.

Depending on the embodiment and the field of application, only a single latching element is present. This latching element can engage on only one side or on a plurality of sides of the pipe. In other embodiments, two or more latching elements are present.

The pipe receptacle is preferably formed from plastics. Embodiments made of metal or a different material are, however, also possible. The shape of the receiving opening of the pipe receptacle is adapted to the external shape of the pipe to be received. In particular, the receiving opening is circular, elliptical or rectangular with rounded short side surfaces. Depending on the shape, therefore, the device is suitable, in particular, for receiving round pipes or flat pipes.

In a preferred embodiment, the second point has a longitudinal extent which runs parallel to the longitudinal center plane and perpendicularly to the longitudinal direction of the pipe receptacle. This arrangement is advantageous, in particular, with clamp-like latching elements.

In a preferred embodiment, the latching element is a bow-shaped clamp with two lateral limbs, a web connecting the two lateral limbs and two fastening limbs. The two fastening limbs together form the first point and the web forms the second point.

These bow-shaped clamps can be produced and fastened cost-effectively. The bow-shaped clamps additionally permit an automatic latching in a corrugation trough of the pipe. The clamp can be manufactured, for example, from plastics or metal. Preferably, the clamp is configured in one piece. Depending on the embodiment, the clamp is a separate component which is releasably or fixedly connected to the pipe receptacle. In other embodiments, the clamp is configured in one piece with the pipe receptacle.

In one embodiment, the two fastening limbs terminate freely and they form the first point in their imaginary connection.

A single such clamp is sufficient in order to fasten the pipe. However, the two clamps are preferably arranged at two opposing points of the pipe receptacle on the periphery. Thus when the pipe is inserted the clamps engage at two opposing points in the corrugation trough and thus secure the pipe from both sides. If the clamps are configured identically and are arranged at the same axial height of the pipe receptacle, they engage in the same corrugation trough. In other embodiments, a clamp is configured to be longer or to be arranged higher relative to the longitudinal axis of the pipe receptacle, so that it engages in a different corrugation trough. In preferred embodiments, these two clamps are two components which are separate from one another. In other embodiments, the two clamps preferably form a common one-piece component.

In preferred embodiments, two latching elements are present, the two latching elements being arranged on two opposing sides of the periphery of the pipe receptacle. One fastening limb of a latching element is connected to a fastening limb of the other latching element via a connecting limb, such that the two latching elements form a common one-piece component. The two other fastening limbs of the two latching elements preferably transition into one respective freely terminating connecting limb. Due to the free connecting limb, the component, i.e. the double-sided clamp, can be assembled in a simpler manner onto the or into the pipe receptacle.

Preferably, the latching element is retained in a resilient manner in the pipe receptacle. As a result, the latching element snaps automatically into the corrugation trough and can preferably be released again from the corrugation trough, so that the pipe can be pulled out again from the pipe receptacle.

In preferred embodiments, the latching element protrudes over the pipe receptacle in the region of the second point. As a result, a secure engagement in the corrugation trough is ensured and the pipe receptacle can be configured with simple shapes for the production process. This also reduces the production costs. In a simple embodiment, the pipe receptacle is configured to be substantially cylindrical and it has a uniform length.

In preferred embodiments, the pipe receptacle has at least one recess on the periphery, wherein the latching element protrudes with its second point into this recess. As a result, one or more upwardly protruding side walls are present, the side walls protruding over the second point of the latching element outside the region thereof. These protruding side walls form insertion aids and enhance the protection of the pipe in the connecting region. The insertion aid is further enhanced if the upper ends of the protruding side walls are provided with an outwardly inclined collar or widen outwardly in a different manner at their free end.

The clamp-like latching element is preferably configured and arranged such that when the pipe is inserted into the pipe receptacle it opens easily and, when the inserted pipe is pulled, the retaining forces are automatically increased.

In a preferred embodiment, a seal is present, the seal being arranged in the pipe receptacle for axial contact with one end of the pipe. Preferably, the seal forms a closed ring. The shape of the ring preferably corresponds to the shape of the pipe to be received. In particular, the ring is circular, elliptical or rectangular with rounded short side surfaces. The seal preferably consists of a soft material, in particular a foam material.

Foam materials having closed pores or partially closed pores are preferred. Preferably, the seal is provided at least on its outer surface with a different color from the pipe receptacle.

Preferably, the color is bright, for example red, yellow, pink or orange.

Due to the seal, the connection device can preferably be used for ventilation pipes, in particular for centralized or decentralized building ventilation systems.

The seal is preferably able to be compressed in the axial direction when the pipe is inserted. The seal is thus preferably freely arranged in the pipe receptacle, i.e. not adhesively bonded or welded, or it is fastened, for example adhesively bonded, welded or clamped, in the pipe receptacle merely on its lower front face opposing the insertion direction of the pipe. Preferably, the seal bears against an inner wall of the pipe receptacle.

Depending on the embodiment, the seal can be secured by the latching means against falling out during the transport of the device. This is the case, in particular, when the latching means is configured as a bow-shaped clamp and preferably when the pipe receptacle has a recess into which the clamp protrudes. Already combining the pipe receptacle and the seal in the factory enables the transport of the seal to be secure. Forgetting to insert the seal at the construction site or using unsuitable sealing elements is prevented thereby.

In preferred embodiments, the pipe receptacle forms at least one visual access point to the seal. As a result, before the pipe is fully assembled it can be monitored whether any seal is present at all. Preferably, the visual access point is formed by the recess. If the seal is configured in a different color from the pipe receptacle, it can be identified very simply and rapidly.

In preferred embodiments, the at least one visual access point is partially or entirely concealed by the pipe when the pipe is correctly and fully inserted and fastened. As a result, it can be monitored whether the pipe is fully inserted, and the seal is thus ensured. If the pipe is insufficiently inserted or secured, the seal might still be at least partially visible. In further embodiments, the inserted pipe only partially conceals the seal so that its presence can still be identified even when the pipe is inserted. The monitoring as to whether the pipe has been inserted sufficiently far can be achieved, for example, by a two-color seal or by markings. This visual access point increases the quality assurance on site.

It is a further object of the invention to increase the quality assurance when connecting a pipe, in particular, on a construction site.

This connection device according to the invention for a pipe comprises a pipe receptacle having a receiving opening for receiving an end of the pipe, at least one fastening element for fastening the pipe in the pipe receptacle and a seal. The pipe receptacle permits at least one first visual indication relating to the seal before the pipe is inserted and the pipe receptacle permits a second visual indication, which differs from the first visual indication, when the pipe is correctly and fully inserted and fastened.

This device is claimed as a separate invention. The device can preferably be configured as the above-described device. The above description in the section "Summary of the invention" thus relates to this device, wherein the fastening element is not necessarily a latching element and does not have to be arranged relative to the pipe receptacle and the pipe as in claim 1. The pipe is preferably a corrugated pipe. However, connection devices for other pipes, for example for pipes with smooth outer surfaces, can also be configured according to this invention. The features of the dependent claims can thus be combined with this claim 15 even without the features of claim 1.

The visual indication can consist, as in the above examples, in that the seal is initially visible and subsequently only partially visible or no longer visible at all. For example, two apertures or recesses can be formed, the two apertures or recesses being arranged one behind the other in the insertion direction of the pipe. Before the pipe is inserted the seal is visible in both apertures and after the pipe has been inserted the seal is only visible in one aperture. In this manner, it is monitored not only whether the pipe has been correctly inserted but also whether a seal is present at all. In other embodiments, the first visual indication shows the seal and the second visual indication shows the position of the corrugated pipe. These visual indications can be represented by a single aperture or by two separate apertures. The term "aperture" in this text is to be understood as the recess, opening or transparent surface which provides a view into the connection device. The aperture does not have to be surrounded by a frame.

The connection device according to both inventions can be designed in different variants for different fields of application. For example, the connection device can be configured for connecting two pipes. The connection device can be used for connecting a pipe to a pipe having a shaped piece or for connecting a pipe to a manifold, an inlet, an outlet, a fitting or to other elements. The connection can be in a straight line or the connection device permits a deflection and/or a branching of the line formed by the pipe. Accordingly, the receiving opening is configured, for example, as a through-opening or as a branching.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 8 shows a first perspective view of a connection device according to the invention according to a second embodiment;

FIG. 9 shows a second perspective view of the connection device according to FIG. 8;

FIG. 10 shows a first side view of the connection device according to FIG. 8;

FIG. 11 shows a second side view of the connection device according to FIG. 8;

DESCRIPTION OF PREFERRED EMBODIMENTS

Figure 1:
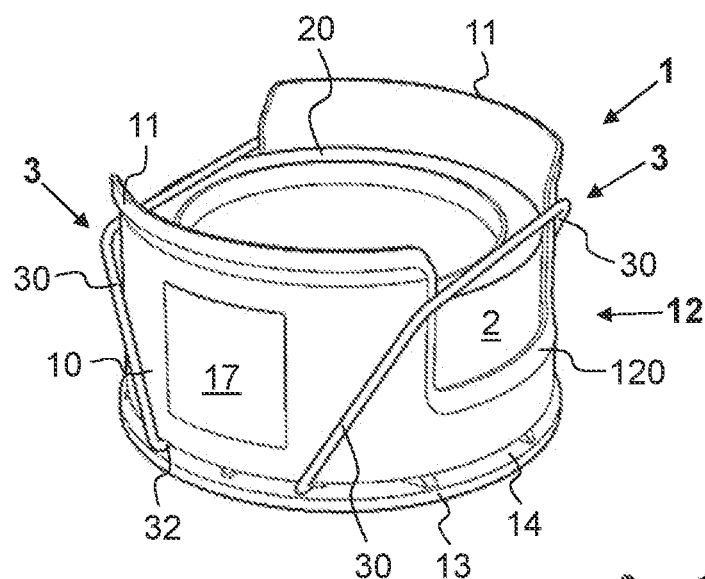
FIG. 1 shows a first perspective view of a connection device according to the invention according to a first embodiment.
Figure 2:
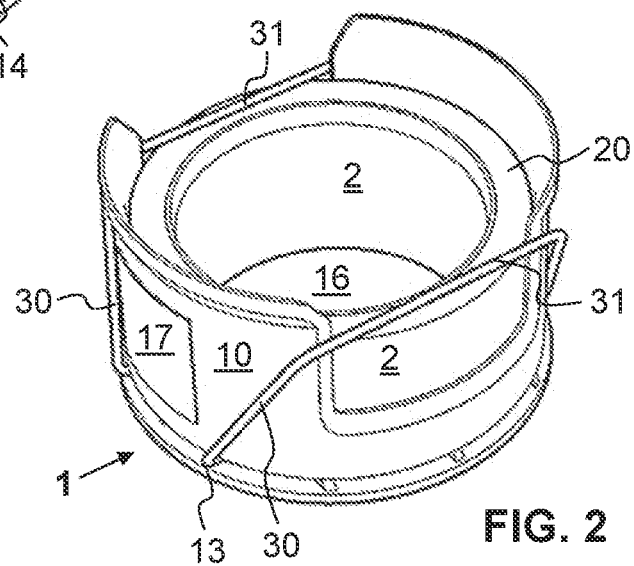
FIG. 2 shows a second perspective view of the connection device according to FIG. 1.

A first exemplary embodiment of the connection device according to the invention is shown in FIGS. 1 to 7. The connection device has a pipe receptacle 1 which is preferably configured from plastics. The pipe receptacle 1 has a substantially cylindrical base body 10 which encloses a receiving opening, in this case a through-opening 16. In this example, the base body 10 is substantially circular cylindrical. The corrugated pipe 4 to be received is a round pipe in this case.

The base body 10 has on its periphery at least one, in this case two, recesses 12. The two recesses 12 are flanked by a wall which forms side walls which are raised thereby. The raised side walls transition into an outwardly inclined collar 11 which forms an insertion aid for the corrugated pipe 4 to be inserted.

A base 13 which is defined from the base body 10 by a partially or fully peripheral groove 14 is arranged at the opposing end of the pipe receptacle 1. Depending on the field of use for which the connection device is planned, the device is provided with further elements. If the device serves, for example, for connecting two pipes, the base 13 is connected to a second pipe receptacle which is configured to be similar or the same and which can receive a second pipe. The common through-opening 16 is rectilinear, angled or curved, depending on the type of connection. A manifold element can also be arranged between the base 13 and the second pipe receptacle, so that two or more lines can branch off, and thus two or more further pipe receptacles are formed with the first pipe receptacle in a common component. Moreover, the base can be fixedly connected to an inlet, an outlet or a fitting or releasably fastened thereto.

A seal 2 is arranged in the pipe receptacle 1. The seal is configured to be hollow-cylindrical and is preferably located on a lower edge formed by the base 13. Preferably, the seal 2 bears against the inner wall of the through-opening 16 but is preferably not fixedly connected to the pipe receptacle 1, at least with its outer lateral surface. The seal 2 has an upwardly oriented planar front face 20. The seal 2 protrudes over the lower edge 120 of the recess 12 but is preferably lower than the two protruding side surfaces with the collar 11. The pipe receptacle 1 is preferably provided with an identification plate 17 or a different type of inscription.

The seal 2 is preferably produced from a flexible compressible material, in particular from a foam material. The seal preferably has a different color from the pipe receptacle 1.

Figure 15:
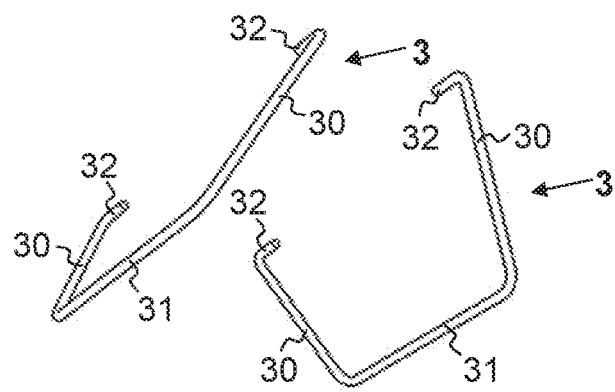
FIG. 15 shows a perspective view of two latching elements of the connection device according to the invention in a first embodiment.

The connection device according to the invention has at least one latching element, in this case in the form of a bow-shaped clamp 3. In this example, there are two clamps 3 which are shown in FIG. 15. The clamps are preferably manufactured from metal or plastics. Preferably, the clamps are configured in one piece and further preferably in the form of a curved bar. Each clamp 3 has two lateral limbs 30, a web 31 connecting these lateral limbs 30 and two freely terminating fastening limbs 32. In this example, the clamp 3 forms a flat plane, wherein the fastening limbs 32 preferably run parallel to the web 31. Alternative embodiments, however, are also possible. Preferably, these individual portions of the clamps 3 are configured in a rectilinear manner. In other embodiments, these individual portions are curved. In particular, the lateral limbs 30 are curved such that they nestle against the outer contour of the pipe receptacle 1. Alternatively or additionally, the web 31 is curved in the assembly direction of the pipe so as to place more load in the direction of the longitudinal center axis of the pipe than at the edge of the pipe, in the case of a load introduced into the pipe. Additionally, such a configuration counteracts the web 31 being bent upwardly.

The clamps 3 are connected to the pipe receptacle 1. Depending on the embodiment, the clamps are pivotably retained, resiliently retained or fixedly connected in a receptacle 15 for the bow-shaped clamp, or integrally formed on the pipe receptacle 1. In the case of a fixed connection or a one-piece integral portion, the bow-shaped clamp is configured such that it permits an at least slightly flexible pivoting movement of the lateral limbs 30 relative to the fixedly retained fastening limbs 32. The web 31 and the lateral limbs 30 thus form the pivotable part of the latching element at the position S1.

In this example, the fastening limbs 32 are retained in the groove 14, as can be clearly identified in FIGS. 1 to 4. Depending on the embodiment, the fastening limbs are adhesively bonded, welded, latched, inserted or pivotably and/or resiliently retained in a corresponding bearing.

Each clamp 3 is connected to the pipe receptacle 1 such that the web 31 comes to rest in the receptacle. At the same time, the web protrudes into the imaginary outer periphery of the pipe receptacle 1. The web 31 preferably protrudes over the upper front face 20 of the seal 2.

Figure 3:
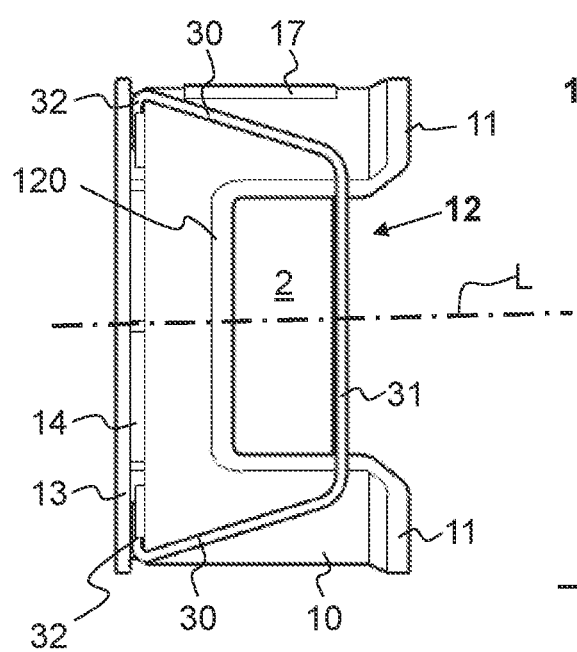
FIG. 3 shows a first side view of the connection device according to FIG. 1.
Figure 4:
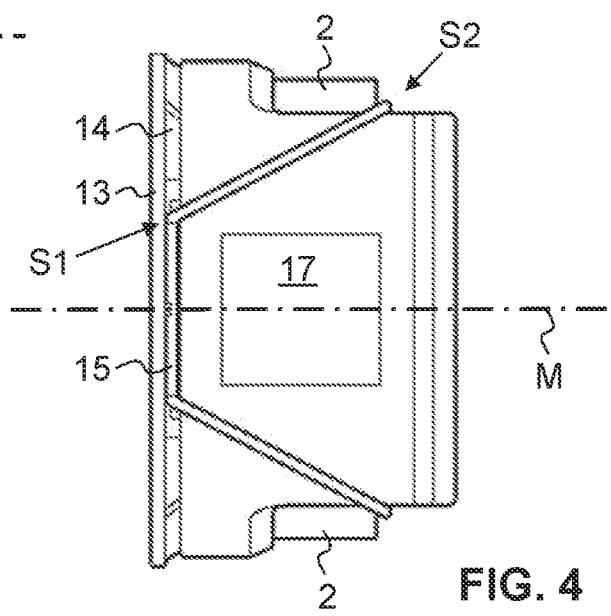
FIG. 4 shows a second side view of the connection device according to FIG. 1.

As can be clearly identified in particular in FIGS. 1 and 4, the point at which the clamp 3 is connected to the pipe receptacle 1, and about which the lateral limbs 30 are pivotable, is located closer to a longitudinal center plane M of the pipe receptacle 1 than the web 31. In FIG. 4, the longitudinal center plane M runs perpendicularly to the drawing plane. In FIG. 3, the longitudinal center plane is located in the drawing plane. In FIG. 3, the longitudinal axis L is shown. This connecting point is denoted here as the first point S1. The web 31 defines a second point S2, the meaning thereof being described below. If two clamps 3 or if a double-sided clamp is present with two webs 31, the longitudinal center plane M is preferably located centrally between the two clamps 3 or between the two webs 31. Preferably, the angle between the longitudinal center plane M and the lateral limbs 30 is between 20° and 45°, in particular approximately 35°.

Figure 5:
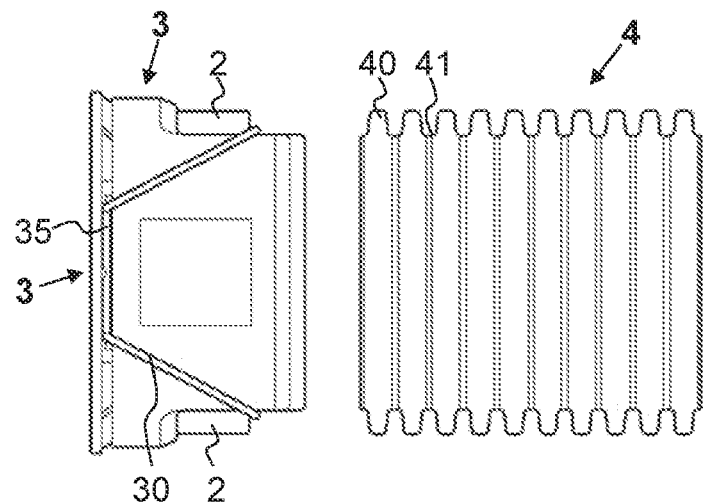
FIG. 5 shows a side view of the connection device according to FIG. 1 before an assembly of a corrugated pipe.
Figure 6:
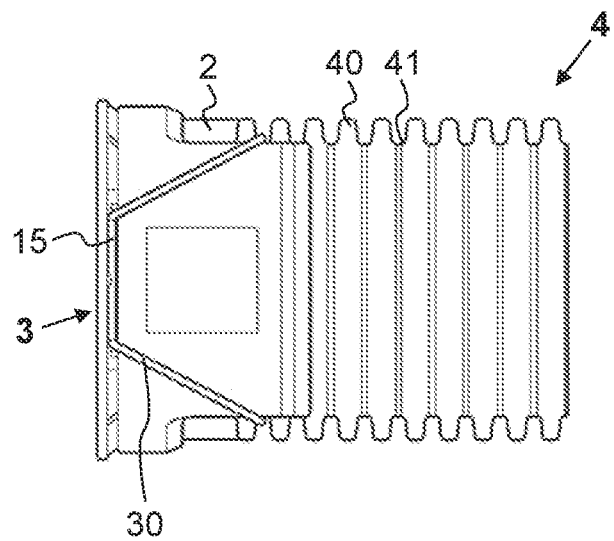
FIG. 6 shows a side view of the connection device according to FIG. 1 during the assembly of the corrugated pipe.
Figure 7:
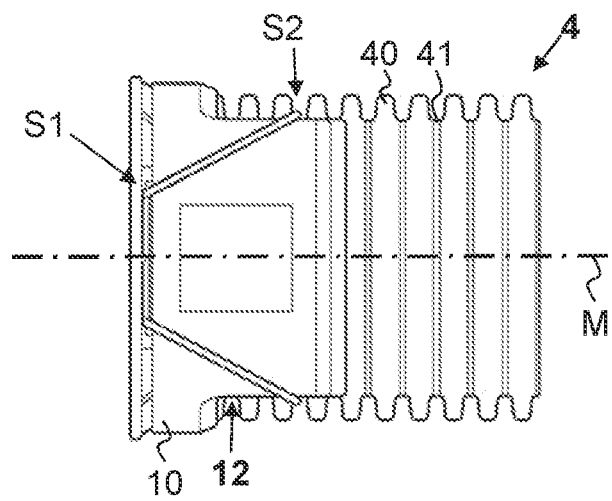
FIG. 7 shows a side view of the connection device according to FIG. 1 after the assembly of the corrugated pipe has taken place.
Figure 12:
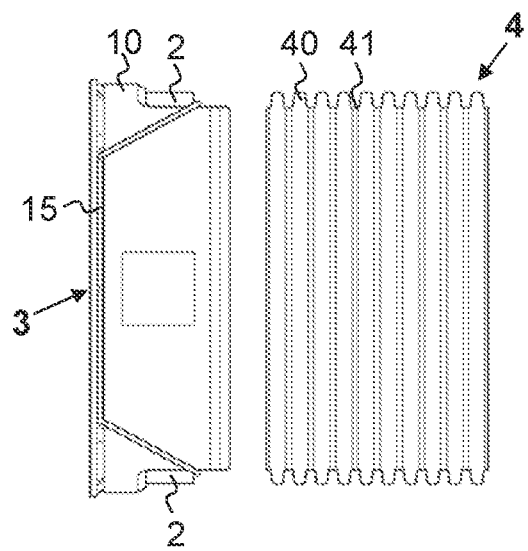
FIG. 12 shows a side view of the connection device according to FIG. 8 before an assembly of a corrugated pipe.
Figure 13:
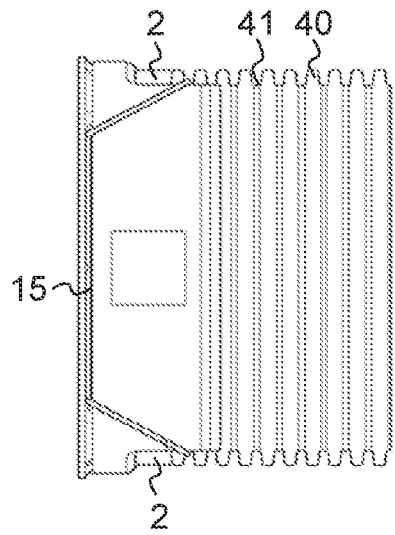
FIG. 13 shows a side view of the connection device according to FIG. 8 during the assembly of the corrugated pipe.
Figure 14:
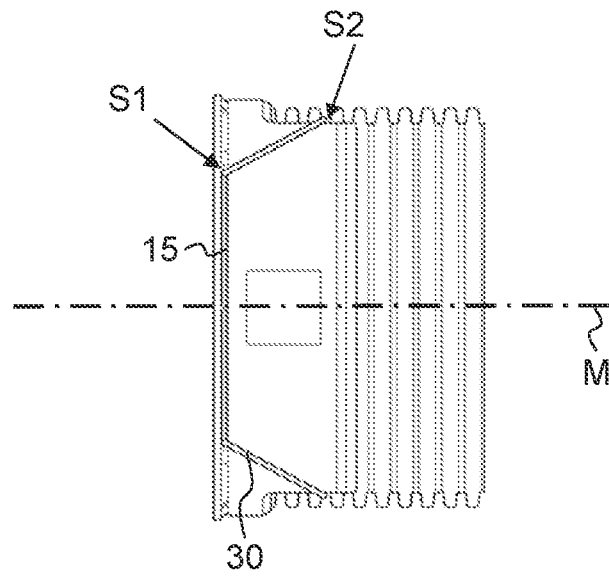
FIG. 14 shows a side view of the connection device according to FIG. 8 after the assembly of the corrugated pipe has taken place.

In FIGS. 5 to 7 it is shown how the corrugated pipe 4 can be connected by this connection device according to the invention. In FIG. 5 the state before the assembly is shown. The seal 2 can be clearly identified. The corrugated pipe 4 has ribs 40 and corrugation troughs 41.

In FIG. 6, the corrugated pipe 4 has now been inserted into the pipe receptacle 1 and the seal 2. The clamp 3 is preferably limited in its position relative to the longitudinal center axis L and to the longitudinal center plane M, by bearing against the side walls of the recess 12, i.e. the aperture. Thus it is ensured that the clamp 3 is always located outside the internal diameter of the pipe 4 and the ribs 40 can press securely onto the clamp 3. If the corrugated pipe 4 is pushed in further, the front face of the corrugated pipe 4 or at least the rib 40 furthest to the front is positioned on the upper front face 20 of the seal. This front face is generally a cut surface. The cut surface can be configured differently. Generally, the cut surface is not planar and often it is not at right-angles to the longitudinal axis of the pipe. The seal 20 is compressed when the corrugated pipe 4 is pushed in further in the axial direction L. The clamp 3 is pushed outwardly by the ribs 40, i.e. the lateral limbs 30 pivot about the point of articulation, i.e. about the first point S1, and the ribs 40 slide along the web 31 downwardly in the direction of the base 13 until the pipe 4 cannot be pushed in any further due to the maximum pressing of the seal 2 or a stop provided in the interior of the pipe receptacle 1. Preferably, in this end position the seal 2 is compressed to a sufficient extent that it is no longer visible in the recess 12. The recess thus forms an aperture or a visual display or a visual access point for the correct connection of the connection device and corrugated pipe 4. In this position, the web 31 and thus the second point S2 are located in a corrugation trough 41 and retain the pipe 4 fixed in this position. The pipe 4 can no longer be pulled out. Rather, the specific arrangement of the first and second point S2 relative to the longitudinal center axis M reinforces the retaining action when the pipe 4 is pulled. The clamp 3, however, can be released by a simple tool, for example by a screwdriver or a rod, in a simple manner from the corrugation trough 41 and the pipe can be removed again.

During the insertion of the pipe 4, if the web 31 were not to come to rest in a corrugation trough 41, after the release of the pipe by the fitter, the seal 2 would push the pipe 4 counter to the assembly direction to a sufficient extent that the web 31 could engage in the next corrugation trough 41. Preferably, the device is configured such that the seal continues to be ensured and the seal 2 is not yet visible in the recess 12, i.e. in the aperture. The assembly thus meets the specifications as before and is correspondingly correct.

A second embodiment is shown in FIGS. 8 to 14. The same parts are provided with the same reference signs and are not described again in detail. This connection device is suitable for connection to a flat corrugated pipe 4. The base body 10 is configured in turn to be hollow-cylindrical. The base body now has, however, an elongated basic shape with two planar side walls 100 arranged parallel to one another and two opposing outwardly curved side walls 101. Each clamp 3 is arranged in the region of one of the two curved side walls 101. The two curved side walls 101 have corresponding recesses 12, the seal 2 in turn protruding over said recesses. These recesses 12 also serve as a visual access point for monitoring the correct assembly. The web 31 of the clamp 3 in turn protrudes into these recesses 12 and preferably protrudes over the seal 2. In this case, however, the web 31 is also preferably located below the uppermost edge of the pipe receptacle 1. In FIG. 10 the longitudinal center plane M runs perpendicularly to the drawing plane. In figure lithe longitudinal center plane is located in the drawing plane. The longitudinal axis L is shown in FIG. 11.

In other embodiments, irrespective of the shape of the pipe receptacle, no recess is present and/or the web 31 protrudes over the uppermost edge of the pipe receptacle 1. In particular in the last-mentioned case, no indentation or recess 12 is required in the pipe receptacle 1 in order to apply the inventive teaching. For example, it is sufficient if the web 31 is curved inwardly in order to be able to engage in the corrugation trough 41 of the inserted pipe 4.

Figure 16:
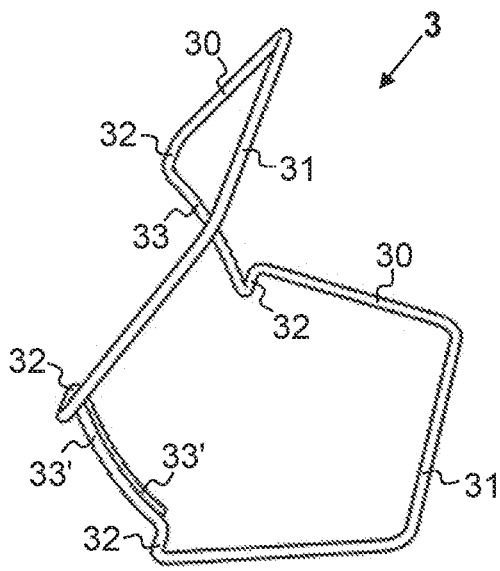
FIG. 16 shows a perspective view of a latching element of the connection device according to the invention in a second embodiment.
Figure 17:
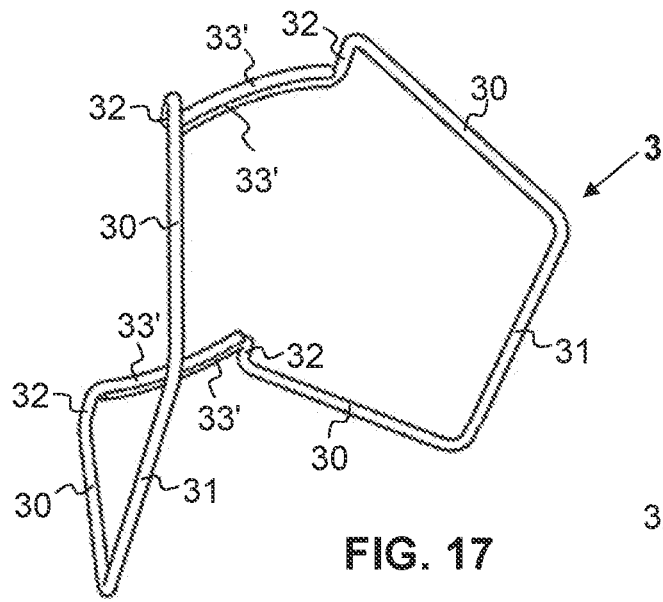
FIG. 17 shows a perspective view of a latching element of the connection device according to the invention in a third embodiment and FIG. 18 shows a perspective view of a latching element of the connection device according to the invention in a fourth embodiment.
Figure 18:
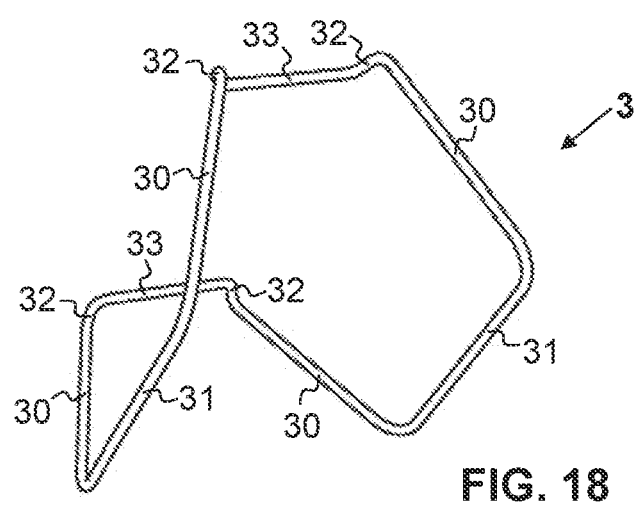

The clamp 3 can have very different shapes. The clamp can also be designed, for example, as a double clamp as shown in FIGS. 16 to 18. In the embodiment according to FIG. 16, two pairs of lateral limbs 30 with one respective web 31 connecting the lateral limbs are present. The two pairs of lateral limbs 30 preferably enclose an angle of between 40° and 90°, preferably of approximately 70°. The fastening limbs 32 adjoining the lateral limbs 30 are curved toward one another and thus no longer run parallel to the webs 31. Alternatively, the fastening limbs run parallel to the webs 31. A free end of one of the fastening limbs 32 of the first pair is connected by means of a first connecting limb 33 to a fastening limb 32 of the second pair. One respective second connecting limb 33' is also arranged on the two other fastening limbs 32 of the pairs. These second connecting limbs 33', however, are not connected together but bear against one another or on one another. As a result, the clamp 13 can be inserted in a simpler manner into the groove 14 and connected to the pipe receptacle 1. In FIG. 16 the connecting limbs 33, 33' are configured to be curved. However, the connecting limbs can also be configured in a rectilinear manner.

The curved design of the connecting limbs 33, 33' and/or the lateral limbs 30 has the advantage that the clamps are more suitably adapted to the contour of the pipe receptacle 1. As a result, less installation space is required and the load can be more effectively introduced into the pipe receptacle 1. The rectilinear design of the limbs has the advantage that it leads to lower manufacturing costs.

In the embodiment according to FIG. 17, pairs of connecting limbs 33' are present on both sides. These connecting limbs can run freely toward one another, bear against one another or be fixedly connected together, for example welded or soldered.

In the embodiment according to FIG. 18, the double clamp is formed from a single, closed and curved wire loop.

The connection device according to the invention permits a simple and secure and preferably leak-tight fastening of a pipe.

The invention claimed is:

1. A connection device for a peripherally ribbed pipe, wherein the connection device comprises a pipe receptacle having a receiving opening for receiving an end of the pipe and at least one latching element for fastening the pipe in the pipe receptacle, wherein the pipe receptacle has a longitudinal center plane which extends through the receiving opening, wherein the latching element has a first point which allows movement of at least part of the latching element relative to the pipe receptacle, and a second point which is designed to engage in a corrugation trough of the peripherally ribbed pipe, wherein, at least when the pipe is inserted and fastened, the first point lies closer to the longitudinal center plane than the second point, and wherein at least one recess is present at a periphery of the pipe receptacle providing a view into the connection device, wherein a seal is present, the seal being arranged in the pipe receptacle for axial contact with one end of the pipe and wherein the at least one recess forms at least one visual access point to the seal.

2. The connection device as claimed in claim 1, wherein the second point has a longitudinal extent which runs parallel to the longitudinal center plane and perpendicularly to the longitudinal direction of the pipe receptacle.

3. The connection device as claimed in claim 1, wherein the latching element is a bow-shaped clamp with two lateral limbs, a web connecting the two lateral limbs and two fastening limbs, wherein the fastening limbs together form the first point and the web forms the second point.

4. The connection device as claimed in claim 3, wherein the fastening limbs terminate freely.

5. The connection device as claimed in claim 3, wherein two clamps are present, the two clamps being arranged on two opposing sides of the periphery of the pipe receptacle, and wherein one fastening limb of one of the clamps is connected to a fastening limb of the other clamp via a connecting limb, such that the two clamps form a common one-piece component.

6. The connection device as claimed in claim 5, wherein the two other fastening limbs of the two clamps transition into one respective freely terminating connecting limb.

7. The connection device as claimed in claim 1, wherein the latching element is retained in a resilient manner in the pipe receptacle.

8. The connection device as claimed in claim 1, wherein the latching element protrudes over the pipe receptacle in the region of the second point.

9. The connection device as claimed in claim 1, wherein the latching element protrudes with its second point into the at least one recess.

10. The connection device as claimed in claim 1, wherein the seal is able to be compressed in the axial direction when the pipe is inserted.

11. The connection device as claimed in claim 10, wherein the seal bears against an inner wall of the pipe receptacle.

12. The connection device as claimed in claim 1, wherein the pipe receptacle has at least one recess on its periphery and wherein the latching element protrudes with its second point into this recess and wherein the visual access point is formed by the recess.

13. The connection device as claimed in claim 1, wherein the at least one visual access point is partially or entirely concealed by the pipe when the pipe is correctly and fully inserted and fastened.

14. The connection device as claimed in claim 1, wherein the pipe receptacle permits at least one first visual indication relating to the seal before the pipe is inserted and in that the pipe receptacle permits a second visual indication, which differs from the first visual indication, when the pipe is correctly and fully inserted and fastened.

15. A connection device for a peripherally ribbed pipe, wherein the connection device comprises a pipe receptacle having a receiving opening for receiving an end of the pipe and at least one latching element for fastening the pipe in the pipe receptacle, wherein the pipe receptacle has a longitudinal center plane which extends through the receiving opening, wherein the latching element has a first point which allows movement of at least part of the latching element relative to the pipe receptacle, and a second point which is designed to engage in a corrugation trough of the peripherally ribbed pipe, wherein, at least when the pipe is inserted and fastened, the first point lies closer to the longitudinal center plane than the second point, wherein a seal is present, the seal being arranged in the pipe receptacle for axial contact with one end of the pipe, wherein the pipe receptacle forms at least one visual access point to the seal, wherein the pipe receptacle has at least one recess on its periphery, and wherein the latching element protrudes with its second point into this recess and wherein the visual access point is formed by the recess.

16. A connection device for a peripherally ribbed pipe, wherein the connection device comprises a pipe receptacle having a receiving opening for receiving an end of the pipe and two latching elements for fastening the pipe in the pipe receptacle, wherein the pipe receptacle has a longitudinal center plane which extends through the receiving opening, wherein each of the latching elements has a first point which allows movement of at least part of the latching element relative to the pipe receptacle, and a second point which is designed to engage in a corrugation trough of the peripherally ribbed pipe, wherein, at least when the pipe is inserted and fastened, the first point lies closer to the longitudinal center plane than the second point, and wherein at least one recess is present at a periphery of the pipe receptacle providing a view into the connection device;

wherein the latching elements are bow-shaped clamps, each clamp having two lateral limbs, a web connecting the two lateral limbs and two fastening limbs, wherein the fastening limbs together form the first point and the web forms the second point;

wherein the latching elements are arranged on two opposing sides of the periphery of the pipe receptacle; and wherein one fastening limb of one of the clamps is connected to a fastening limb of the other clamp via a connecting limb, such that the two clamps form a common one-piece component.

* * * * *